(12) United States Patent
Foran et al.

(10) Patent No.: US 11,987,033 B2
(45) Date of Patent: May 21, 2024

(54) SYSTEM AND METHOD OF DIELECTRIC BONDING

(71) Applicant: Teijin Automotive Technologies, Inc., Auburn Hills, MI (US)

(72) Inventors: Hugh Foran, Auburn Hills, MI (US); Noriyuki Amano, Auburn Hills, MI (US); Joshua Dech, Auburn Hills, MI (US)

(73) Assignee: Teijin Automotive Technologies, Inc., Auburn Hills, MI (US)

( * ) Notice: Subject to any disclaimer, the term of this patent is extended or adjusted under 35 U.S.C. 154(b) by 0 days.

(21) Appl. No.: 17/896,314

(22) Filed: Aug. 26, 2022

(65) Prior Publication Data

US 2023/0074158 A1 Mar. 9, 2023

Related U.S. Application Data

(60) Provisional application No. 63/237,194, filed on Aug. 26, 2021.

(51) Int. Cl.
*B32B 37/06* (2006.01)
*B32B 5/02* (2006.01)
(Continued)

(52) U.S. Cl.
CPC ............... *B32B 37/06* (2013.01); *B32B 5/02* (2013.01); *B32B 7/12* (2013.01); *B32B 15/14* (2013.01);
(Continued)

(58) Field of Classification Search
CPC ........ B29C 66/80–81885; B29C 65/04; B29C 35/12; B32B 2310/0868; B32B 37/06;
(Continued)

(56) References Cited

U.S. PATENT DOCUMENTS

| 4,427,865 A | 1/1984 | Watanabe |
| 4,941,937 A | 7/1990 | Iseler et al. |

(Continued)

FOREIGN PATENT DOCUMENTS

| DE | 102015219580 A1 * | 4/2017 |
| FR | 2547529 A1 * | 12/1984 |

(Continued)

OTHER PUBLICATIONS

Int'l Search Report for PCT/US2022/041659, dated Dec. 15, 2022.

*Primary Examiner* — John L Goff, II
(74) *Attorney, Agent, or Firm* — MaxGoLaw PLLC

(57) ABSTRACT

A system and method for dielectric bonding including a dielectric heater having a pair of opposing electrode plates, a nest removably coupled to a first electrode plate of the pair of electrode plates, and an interchangeable electrode assembly removably coupled to a second electrode plate of the pair of electrode plates. The nest having a plurality of cooling channels defined in a body thereof in which a cooling fluid circulates to cool a material assembly that is supported by the nest. The interchangeable electrode assembly having a plurality of concentrator members that are configured to concentrate energy from a voltage source in predetermined locations on the material assembly.

18 Claims, 6 Drawing Sheets

(51) Int. Cl.
 *B32B 7/12* (2006.01)
 *B32B 15/14* (2006.01)
 *B32B 37/08* (2006.01)
 *B32B 37/12* (2006.01)
 *B62D 29/00* (2006.01)

(52) U.S. Cl.
 CPC .............. *B32B 37/08* (2013.01); *B32B 37/12* (2013.01); *B32B 2260/021* (2013.01); *B32B 2260/046* (2013.01); *B32B 2305/022* (2013.01); *B32B 2305/08* (2013.01); *B32B 2305/77* (2013.01); *B32B 2309/04* (2013.01); *B32B 2310/0868* (2013.01); *B32B 2605/08* (2013.01); *B62D 29/00* (2013.01)

(58) Field of Classification Search
 CPC ........... B32B 37/08; B32B 37/12; B32B 5/02; B32B 7/12; B32B 15/14; B32B 2260/021; B32B 2260/046; B32B 2305/022; B32B 2305/08; B32B 2305/77; B32B 2309/04; B32B 2605/08
 USPC ........................................... 156/274.4, 274.8
 See application file for complete search history.

(56) References Cited

U.S. PATENT DOCUMENTS

| | | | |
|---|---|---|---|
| 2004/0046423 A1* | 3/2004 | Wieber | B62D 27/026 296/29 |
| 2005/0252896 A1 | 11/2005 | Fletcher et al. | |
| 2019/0352546 A1 | 11/2019 | Taya et al. | |

FOREIGN PATENT DOCUMENTS

| | | | |
|---|---|---|---|
| GB | 2053084 A | * | 2/1981 |
| GB | 2097720 A | * | 11/1982 |
| JP | 2010280076 A | | 12/2010 |

* cited by examiner

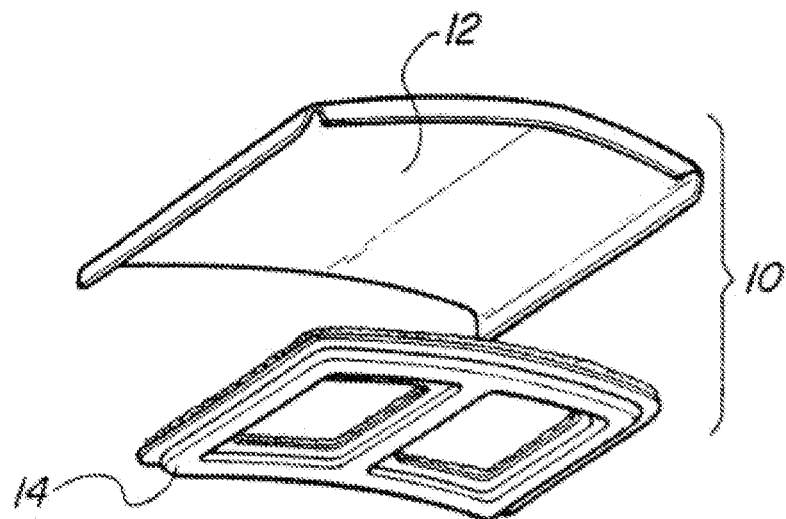
FIG. 1
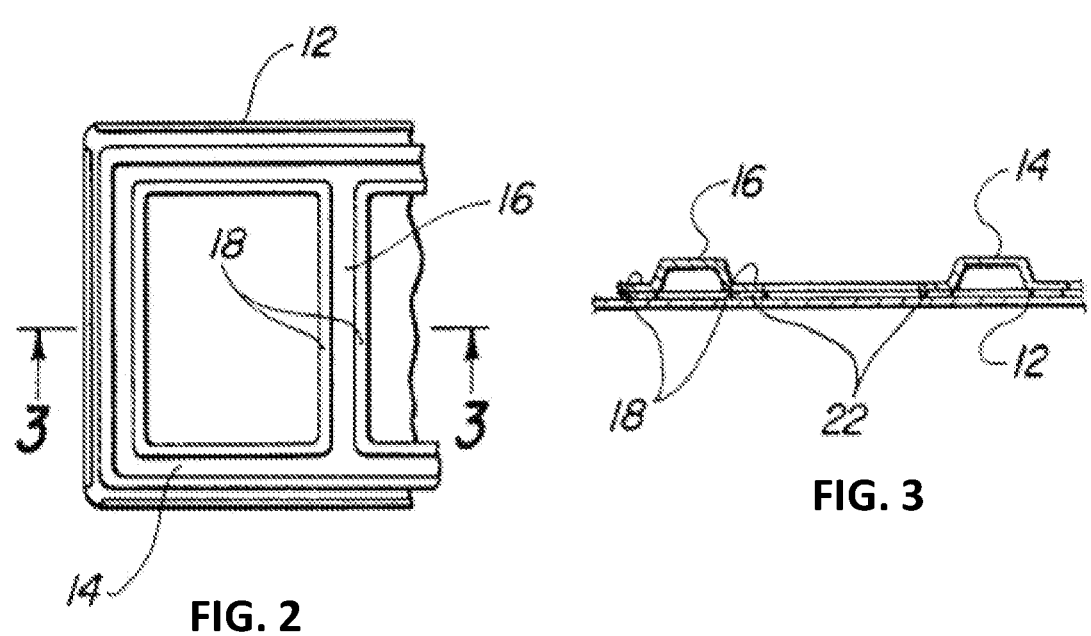
FIG. 2
FIG. 3

SYSTEM AND METHOD OF DIELECTRIC BONDING

RELATED APPLICATIONS

This application claims priority benefit of U.S. Provisional Application Ser. No. 63/237,194 filed on Aug. 26, 2021, the contents of which are hereby incorporated by reference.

FIELD OF THE INVENTION

The present invention relates to bonding techniques and, more particularly, to methods and apparatus for bonding an automotive fiber reinforced plastic (FRP) body member together with other reinforcing members.

BACKGROUND OF THE INVENTION

Weight savings in the automotive, transportation, and logistics based industries has been a major focus in order to make more fuel efficient vehicles both for ground and air transport. In order to achieve these weight savings, light weight composite materials have been introduced to take the place of metal structural and surface body components and panels. Composite materials are materials made from two or more constituent materials, a reinforcement material and a matrix material, with significantly different physical or chemical properties, that when combined, produce a material with characteristics different from the individual components. The individual components remain separate and distinct within the finished structure. A composite material may be preferred for many reasons: common examples include materials which are stronger, lighter, or less expensive when compared to traditional materials. Furthermore, resin-based articles can be tailored by changes in resin chemistry and additives to meet a range of requirements. Additionally, while metal forming of complex shapes requires several steps, a well-designed mold can impart complex shapes in a single step.

The use of reinforcing fiber inclusions to strengthen a matrix is well known to the art. Well established mechanisms for the strengthening of a matrix include slowing and elongating the path of crack propagation through the matrix, as well as energy distribution associated with pulling a fiber free from the surrounding matrix material. In the context of sheet molding composition (SMC) formulations, bulk molding composition (BMC) formulations, and resin transfer molding (RTM), fiber strengthening has traditionally involved usage of chopped glass fibers. There is a growing appreciation in the field of molding compositions that replacing in part, or all of the glass fiber in molding compositions with carbon fiber can provide improved component properties. For example, the use of carbon fibers in composites, sheet molding compositions, and resin transfer molding results in formed components with a lower weight as compared to glass fiber reinforced materials. The weight savings achieved with carbon fiber reinforcement stems from the fact that carbon has a lower density than glass and produces stronger and stiffer parts at a given thickness.

However, high quality surface finishes, such as an automotive exterior panel high gloss surface in the auto industry that is characterized by a high surface sheen, are generally obtained only with highly tailored resin formulations that contain glass fibers, such as TCA® and TCA ULTRALITE® resins commercially available from Continental Structural Plastics, Inc. used in SMC or RTM, or metals such as aluminum and alloys thereof. High gloss surfaces are generally required for vehicle surface panels, such as doors, hoods, quarter panels, trunks, roof structures, bumpers, etc.

Vehicle surface panels, such as doors, hoods, quarter panels, trunks, roof structures, bumpers, etc., are often large components that make up a significant amount of weight in a vehicle. It is often necessary to reinforce these larger exterior FRP panels or members with a reinforcement member in order to provide the resulting assembly with sufficient rigidity and mechanical strength. However, technical problems remain that include disparate layer joinder, surface quality of the resultant component, manufacturing costs, and manufacturing throughput.

Thus, there exists a need for bonding techniques and, more particularly, methods and apparatus for bonding an automotive fiber reinforced plastic (FRP) body member together with a reinforcing member in order to provide the resulting assembly with sufficient rigidity and mechanical strength while also providing weight reduction of the resultant component, a high quality surface finish of the resultant component, reduced manufacturing costs, and increased manufacturing throughput.

SUMMARY OF THE INVENTION

The present invention provides a system for dielectric bonding that includes a dielectric heater having a pair of opposing electrode plates, a nest removably coupled to a first electrode plate of the pair of electrode plates, and an interchangeable electrode assembly removably coupled to a second electrode plate of the pair of electrode plates. The nest has a plurality of cooling channels defined in a body thereof in which a cooling fluid circulates to cool a material assembly that is supported by the nest. The interchangeable electrode assembly has a plurality of concentrator members that are configured to concentrate energy from a voltage source in predetermined locations on the material assembly.

The present invention additionally provides a method of bonding a material assembly using the inventive dielectric bonding system. The method includes providing the material assembly for bonding, coupling the nest to the first electrode plate of the pair of electrode plates, coupling the electrode assembly to the second electrode plate of the pair of electrode plates, positioning the material assembly on the nest, bringing the plurality of concentrator members of the electrode assembly into contact with predetermined locations on the material assembly, applying a high frequency signal to the electrodes from the dielectric heater to bond the material assembly together; and circulating cooling fluid in the plurality of cooling channels defined in the body of the nest to cool the material assembly after bonding.

BRIEF DESCRIPTION OF THE DRAWINGS

The present invention is further detailed with respect to the following drawings that are intended to show certain aspects of the present invention, but should not be construed as a limit on the practice of the present invention.

FIG. 1 is an exploded perspective view of an assembly comprising an exterior automotive body member and a reinforcement member therefor;

FIG. 2 is a partial bottom plan view of the assembly of FIG. 1;

FIG. 3 is a partial sectional view of the assembly of FIG. 1 taken along lines 3-3 of FIG. 2;

DESCRIPTION OF THE INVENTION

Figure 4:
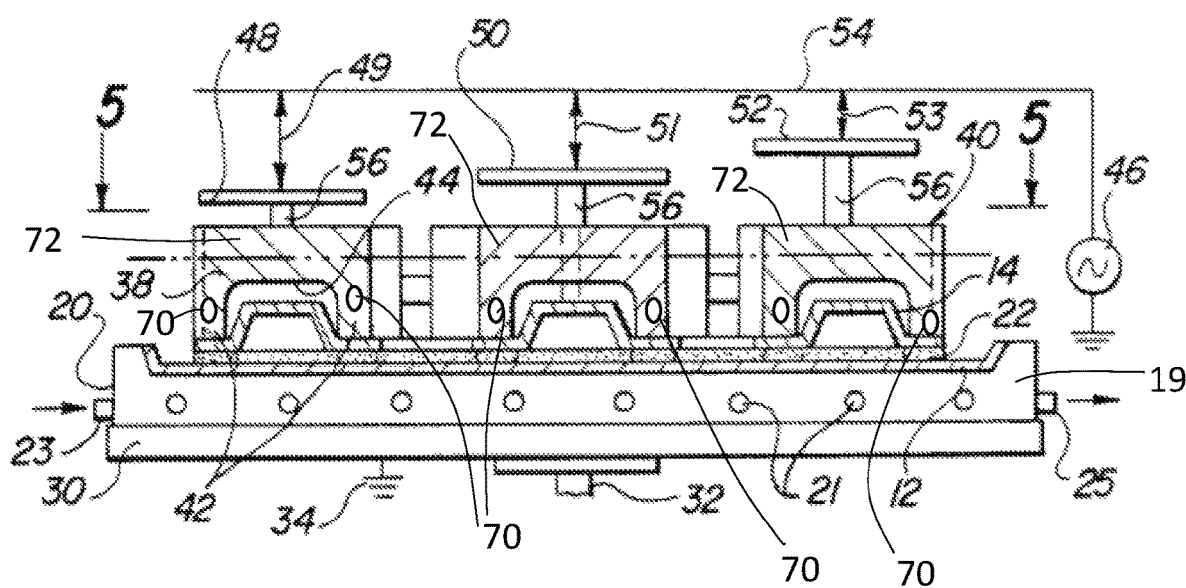
FIG. 4 is a cross-sectional view taken along lines 4-4 of FIG. 5, which illustrates in simplified form an inventive system for carrying out an inventive method according to embodiments of the present invention.

The present invention has utility as an apparatus and method for bonding an automotive fiber reinforced plastic (FRP) body member together with other reinforcing members in order to provide the resulting assembly with sufficient rigidity and mechanical strength while also providing weight reduction of the resultant component, a high quality surface finish of the resultant component, reduced manufacturing costs, and increased manufacturing throughput.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

The present invention is particularly concerned with providing reinforced exterior automotive body assemblies such as hoods, doors, roofs, trunk lids, and bumper assemblies. The invention provides an expeditious method for bonding a first, typically exterior, fiber reinforced plastic member and a second reinforcing member, which is also preferably manufactured of a fiber reinforced plastic, although other plastic materials or even metal may be used. In certain cases, such as the bumper assembly, the first and second members are more appropriately described as mutually reinforcing since the second member may actually define part of the exterior surface of the automotive assembly, e.g., to locate automobile features such as signal lights or head lights.

The invention is described in detail below with reference to the manufacture of an automotive hood assembly, however, it will be appreciated by those skilled in the art that the present invention, as defined by the appended claims, is clearly not limited to this particular application.

A hood assembly, generally designated by the numeral 10, is illustrated in the drawings. The hood assembly 10 includes a relatively thin (about 0.080 to 0.120 inch thick) outer skin member 12 and a reinforcement member 14. According to embodiments, the outer skin member 12 is constructed of fiber reinforced plastic (FRP) and is preferably made from thermosetting sheet molding compound (SMC) material that is reinforced with chopped and dispersed glass fibers having class-A finish SMC, such as TCA ULTRALITE® resins commercially available from Continental Structural Plastics, Inc. According to embodiments, the reinforcement member 14 is formed of a cured layer reinforced with dispersed carbon fibers or a combination of carbon, glass, and natural fibers in a resin transfer molding (RTM) formed epoxy matrix. Embodiments of the two piece vehicle component formed with a TCA ULTRALITE® SMC outer and carbon fiber or hybrid fiber epoxy RTM inner provides the following properties including: an assembly that is 10-15% lighter than aluminum, more cost effective than previous body part constructions. According to embodiments, one or both of the layers is formed of a sandwich composite material such as that detailed in U.S. patent application Ser. No. 15/108,766 filed on Jun. 28, 2016, which is hereby incorporated by reference.

While the present invention is detailed herein as relating to a two-piece construction, it should be appreciated that the two-piece structure described herein is readily repeated to create a multiple layer laminate. By way of example, a predominantly glass fiber filled outer skin layer is joined to opposing surfaces of a core predominantly carbon fiber filled core layer; vice versa; or a series of alternating predominantly fiber filled layers are joined with a pattern A-B-A . . . . B. In certain inventive embodiments, a cured inner portion of molding composition is reinforced predominantly with chopped carbon fibers is joined to a cured outer skin of a second sheet molding composition reinforced predominantly with glass fiber, where the outer surface has an automotive surface quality finish, such as a class-A finish. As used herein, a class-A surface finish is associated with a surface shine and reflectivity required for exterior body panels by automotive manufacturers. In an embodiment, the cured inner portion is substantially devoid of glass fiber, while the outer skin is substantially devoid of chopped carbon fiber.

A surface with an automotive exterior panel high gloss is defined a panel with a Diffracto analysis D number of less than 100 when the mold platen having a Diffracto analysis D number of 25, the surface amendable to sanding, priming and paint finishing to high gloss per ASTM D 523 as measured with a glossmeter.

In a particular inventive embodiment, carbon fibers in a molding composition are present in an inner layer of a vehicle component containing from 10 to 40% by weight carbon fibers of the inner layer, with an outer skin layer of SMC based on the commercially available TCA® or TCA ULTRALITE® (Continental Structural Plastics, Inc.) containing glass fiber containing between 10 and 60% glass fiber by weight of the TCA® portion, as embodied in U.S. Pat. No. 7,655,297. The ratio of thickness of the inner portion to the outer skin ranges from 01-10:1. The resulting SMC inner portion layer and outer skin layer are laid out, formed, and cured separately and the two layers joined thereafter to form a component. Such a two-piece component with an inner layer containing carbon fibers is noted to have a density that is 10, 20, 30 and even 40% lower than the comparable article formed wholly from TCA® or other class-A surface finish resin. In this way, a lightweight article is formed that retains the high surface gloss of a class-A surface. It is appreciated that a given layer, can include both carbon fibers and glass fibers in combination, as well as other types of fibers such as natural cellulosic fibers that illustratively include coconut fibers with the proviso the loading of other types of fibers is limited such that glass fibers are predominantly present in a first layer and carbon fibers are predominantly present in a second layer. The predominant presence of a given type of fiber is used herein to mean that the fiber type represents more than 50% by weight of the total weight of fibers present in the layer. In certain embodiments, each layer is 100% of a given type of fiber, while in other embodiments the predominant fiber is present between 51 and 99%.

The present invention finds particular utility when the skin member 12 is an automotive exterior body panel such as a hood, deck, roof, trunk lid, or the like which has a relatively large surface area exceeding about one square foot and having a length in at least one dimension of 47 inches. These types of panels usually require reinforcement in order to provide them with sufficient mechanical rigidity and it is important to maintain the smooth aesthetically pleasing outer surface of the skin typically required by the automobile manufacturers. This standard is generally referred to in the industry as a class A surface.

According to embodiments, the reinforcement member 14 is likewise constructed of FRP material, for example one reinforced with glass fibers. In the embodiment illustrated in FIG. 1, the reinforcement member 14 has a generally "FIG. 8" shape design in plan view and each leg is formed of a "hat" design in cross section as can be seen most clearly in FIGS. 3, 4, and 8A-8B. The hat cross section is characterized by a high aspect ratio raised dome portion 16 and a pair of oppositely directed flanges 18.

Figure 7:
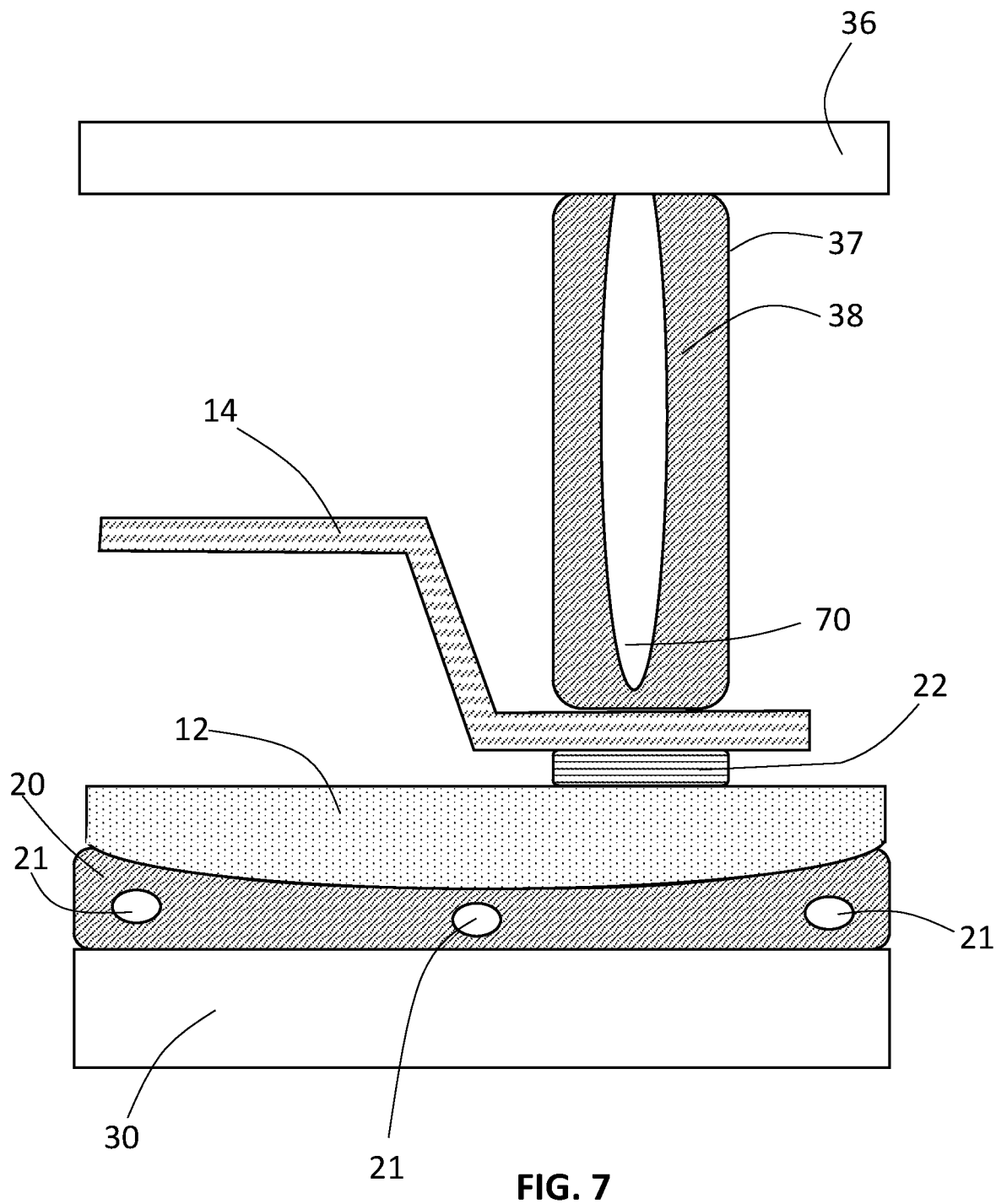
FIG. 7 is a partial cross-sectional view of an inventive system for carrying out an inventive method according to embodiments of the present invention.
Figure 8A:
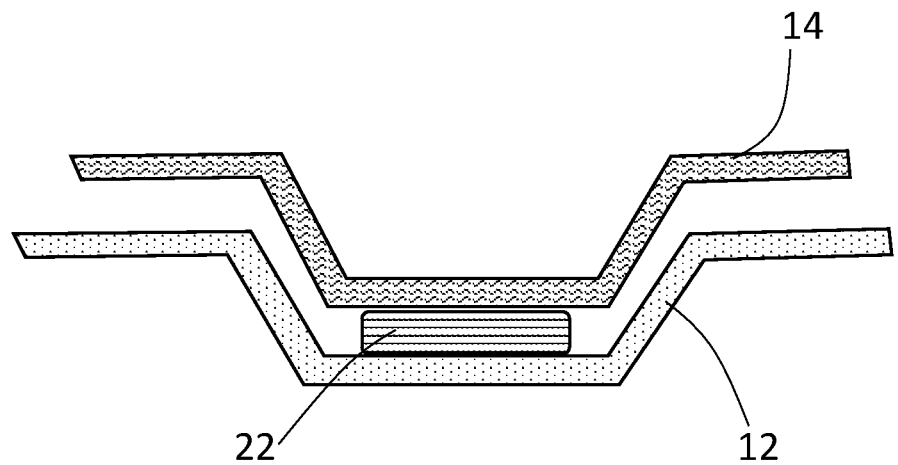
FIGS. 8A and 8B are partial cross-sectional views of an assembly according to embodiments of the present invention in an uncured and cured state, respectively.
Figure 8B:
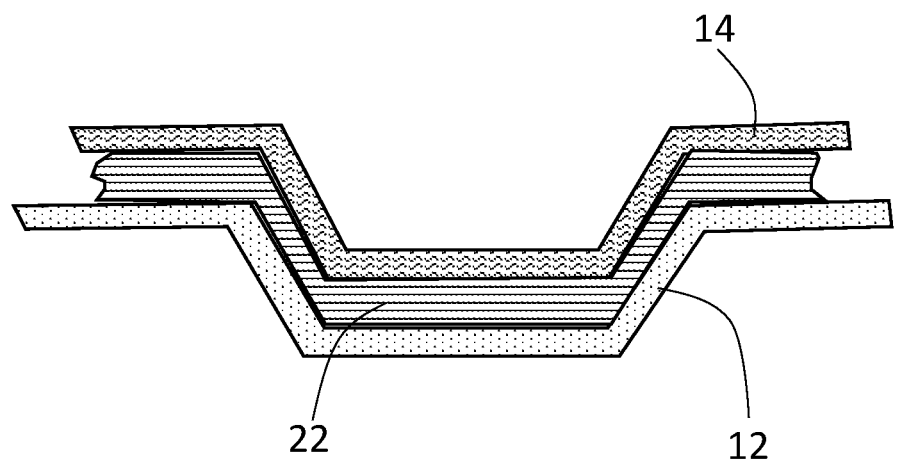

To bond the reinforcement member 14 to the skin member 12, a bead of uncured adhesive 22 is laid between mating surfaces of the layers 12, 14, such as between the flanges 18 and the skin member 12 in FIGS. 3 and 4 or between the dome portions 16 in FIG. 8A. With the adhesive 22 positioned on one of the layers 12, 14, at the dome 16 or flanges 18, the reinforcement member 14 is brought into contact with the interior surface of the skin 12 as shown in FIGS. 3-7. According to embodiments, the adhesive 22 is a thermosetting resin that exhibits a change in dielectric properties when cured upon application of heat. The adhesive bead 22 preferably contains a resin including uncrosslinked polymers, oligomers, monomers; or a combination thereof with a second part including a hardener or catalyst. According to embodiments, epoxy resin adhesives are preferred although polyurethanes are also acceptable. These adhesives are distinguished from glues such as animal glues which do not rely upon a chemical change to affect their adhesive qualities. As will appear clear from the following discussion, the present invention utilizes this characteristic of certain adhesives to great advantage. By way of specific, but nonlimiting example, adhesive 22 is a Lord 320/322 epoxy adhesive available from Lord Corporation. According to embodiments, the adhesive foams and expands upon application of heat. According to such an embodiment, the adhesive 22 is applied between the layers 12, 14 as described above; however, upon application of the dielectric heater 26 to the adhesive 22, the adhesive foams and expands thereby filling spaces between the layers 12, 14 that otherwise may not be amenable to dielectric heating given, for example, the high aspect ratio of the layers 12, 14, as best shown in FIGS. 8A and 8B.

In order to bond the skin member 12 and the reinforcement member 14 together using the uncured adhesive 22, the present invention provides a system for dielectric bonding 100 that is configured to apply a high frequency signal to predetermined locations containing the uncured adhesive 22 in order to cure the adhesive 22, thereby bonding the skin member 12 and the reinforcement member 14 together. The system 100 is advantageous in that it quickly bonds the different layers of materials together using high temperatures resulting from the dielectric heater utilized and then quickly cools the materials so that the bonded materials may be safely handled soon after cure. This greatly improves cycle time and manufacturing throughput of these vehicle components. However, it will be understood that the extreme temperatures and rapid temperature changes such as those utilized by the present invention present significant hurdles such as damage to the materials given prolonged exposure to high temperatures and cracking or buckling of the bonded part due to material differences and their response to rapid cooling. The present invention overcomes the hurdles and balances the variables including material properties, temperature exposure, time of temperature exposure, cooling, etc. to result in bonded high strength, light-weight composite vehicle components having sufficient rigidity and mechanical strength while also providing weight reduction of the resultant component, a high-quality surface finish of the resultant component, reduced manufacturing costs, and increased manufacturing throughput.

Figure 6:
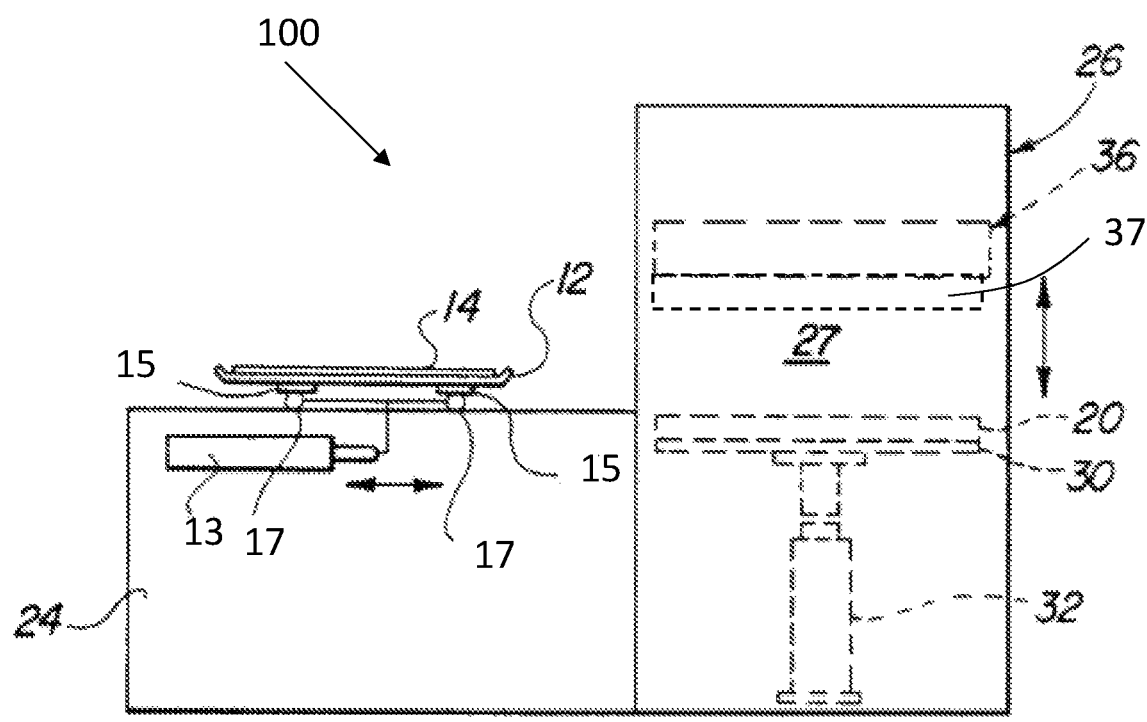
FIG. 6 is a front view of the system of FIGS. 4 and 5.

As shown in FIG. 6, an inventive system 100 for dielectric bonding includes a dielectric heater 26 that includes a pair of opposing electrode plates 30, 36, an interchangeable nest 20, and an interchangeable electrode assembly 37. When installed within the dielectric heater 26, the interchangeable nest 20 is removably coupled to a first electrode plate 30 of the pair of electrode plates. The nest 20 is configured to support the material assembly 10, namely the assembled layers of material including the skin member 12, the reinforcement member 14, and the uncured adhesive 22. According to embodiments, the nest 20 is configured to support the material assembly by contacting the exterior surface of the skin member 12. As best shown in FIG. 4, the nest 20 has a plurality of cooling channels 21 defined in a body 19 thereof, the cooling channels 21 are configured to circulate a cooling fluid therein to cool the material assembly. According to embodiments, the cooling fluid is any of air, water, liquid nitrogen, or any other suitable cooling medium. Furthermore, when installed within the dielectric heater 26, the interchangeable electrode assembly 37 is removably coupled to a second electrode plate 36 of the pair of electrode plates. The electrode assembly 37 has a plurality of concentrator members 38 configured to concentrate energy from a voltage source 46 in predetermined locations on the material assembly 10, namely, the predetermined locations where the layers of material 12, 14 are to be joined together using the adhesive 22, such as at the flanges 18 or the dome portions 16.

According to embodiments and as can be seen most clearly in FIGS. 4 and 7, the upper surface of nest 20 is contoured so that it corresponds to the contour of the exterior or class A surface of skin 12 to provide it with uniform support during the bonding process. According to embodiments, the system 100 includes a plurality of interchangeable nests 20, with each having a different contoured surface that corresponds to the contour of different shapes of exterior surfaces of skin 12, thus allowing the inventive system 100 to be utilized for bonding components of various shapes and sizes simply by swapping out the interchangeable nest 20 and/or the interchangeable electrode assembly 37. According to embodiments, the nest 20 is made of material which exhibits low dielectric loss characteristics, such as aluminum or brass. A cooling medium is circulated through a cooling channel 21 of the nest 20 from an inlet 23 to an outlet 25 in order to maintain the exterior surface of skin 12 at a constant temperature of 40-150° F. throughout the bonding process and to quickly cool the material assembly 10 after the adhesive 22 has been cured.

Figure 5:
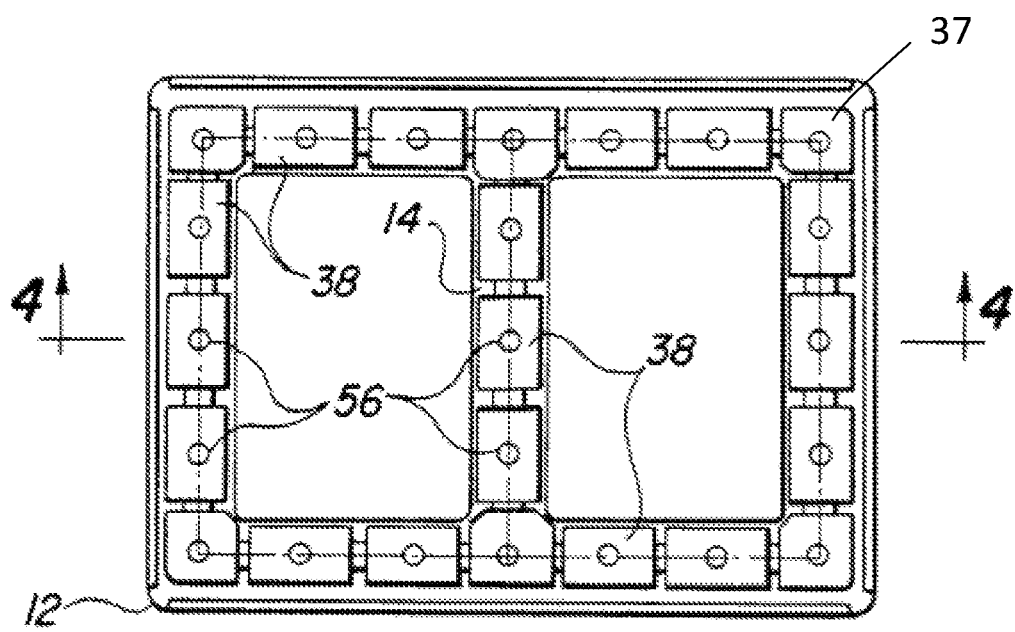
FIG. 5 is a cross-sectional view taken along lines 5-5 of FIG. 4.

According to embodiments and as can be seen most clearly in FIG. 4, the interchangeable electrode assembly 37 includes a series of segmented or electrically isolated concentrator members 38 held together in a fixed position by a frame 40 (see FIGS. 4 and 5). According to embodiments, the plurality of concentrator members 38 are projections 42 that extend away from the interchangeable electrode assembly 37 toward the interchangeable nest 20. According to embodiments, the concentrator members 38 each have a generally U-shaped lower section having with a pair of projections 42 extending therefrom. The projections 42 of the concentrator members 38 are configured so that they generally correspond to the flanges 18 of reinforcement member 14 as shown most clearly in FIG. 4, that is, the concentrator members 38 are positioned to correspond with locations on the material assembly 10 that are to be bonded together. According to such embodiments, a recess 44 provides clearance for the high aspect ratio raised domes 16 of reinforcement member 14. The concentrator members 38 serve to concentrate energy from a high frequency voltage source 46 in selected areas containing the adhesive 22.

According to embodiments, the concentrator members 38 of the interchangeable electrode assembly 37 include a plurality of cooling channels 70 defined in a body 72 thereof, the cooling channels 70 are configured to circulate a cooling fluid therein to cool the material assembly 10. The cooling medium circulated through the cooling channels 70 may be any of air, water, liquid nitrogen, or any other suitable cooling medium.

According to embodiments, the system 100 includes a plurality of interchangeable electrode assemblies 37, with each having a different arrangement of concentrator members 38 that corresponds to different configurations of material assemblies 10 and different patterns of bonding locations, thus allowing the inventive system 100 to be utilized for bonding components of various shapes and sizes simply by swapping out the interchangeable nest 20 and/or the interchangeable electrode assembly 37.

According to embodiments, the electrode assembly 37 further includes a plurality of electrode plates 48 which generally overly the concentrator members 38. In FIG. 4 there are three such plates 48, 50 and 52 shown. However, it should be understood that in practice that many more such plates are employed, e.g., see FIG. 5. Plates 48, 50 and 52 are also constructed of electrically conductive material such as aluminum or brass and they are each connected to high frequency voltage source 46 as illustrated by upper electrode 54. Air gaps 49, 51, and 53 exist between electrode 54 and electrode plates 48, 50 and 52, respectively.

Provision is made for adjusting the relative air gaps or spacing between the electrode plates 48, 50, and 52, and upper electrode 54 (and thus the area below the electrode plates, via members 38, to be heated). The spacing between the electrode plates and the upper electrode 54 will affect the amount of energy applied to the material to be heated. In this embodiment, by adjusting the size of air gaps 49, 51 and 53 it is possible to fine tune the amount of heat that is actually generated in the underlying adhesive. Thus, it becomes possible to further ensure that even heating occurs thereby resulting in a uniform bond strength. Independent adjustment of the heat generated under each concentrator member 38 in effect allows for the application of substantially even heat across the material assembly 10 notwithstanding its size and the inequalities generated thereby. The adjustment can be accomplished in many ways. In FIG. 4, this function is provided by way of a telescoping tube 56 connected between each electrode plate 48, 50 and 52 and its respective concentrator member 38. Depending upon the size of concentrator member 38 and its horizontal area to be heated, more than one electrode plate may be attached thereto via multiple telescoping tubes 56.

According to embodiments, the voltage source 46 generates a high frequency electrostatic field between the electrode assembly 37/upper electrode plate 36 and the lower electrode plate 30. The applied RMS voltage from the voltage source 46 can, for example, be between 300 volts and 8,000 volts. A voltage of less than 300 is disadvantageous because it is believed insufficient to significantly heat adhesive 22. Conversely, an applied value in excess of 8,000 volts is believed disadvantageous because serious electrical insulation problems will begin to occur between electrode plates 48, 50, 52, etc., and ground. According to embodiments, the voltage source 46 applies oscillating or alternating current frequencies in the range of between 13 megahertz and 40 megahertz. Frequencies less than 10 megahertz are believed disadvantageous because voltages required to heat the adhesive 22 are too large to achieve an identical heating time and there is a greater probability of arcing occurring. Frequencies in excess of 110 megahertz are believed disadvantageous because the number of required individual electrode plates 48, 50 and 52 becomes excessively large, compounding the difficulty of obtaining an even heating of the adhesive. Further, coupling between concentrator members 38 becomes more pronounced with frequencies above 110 megahertz, thereby making adjustments of individual electrode plates 48, 50 and 52 more interrelated. It is believed that the optimum frequency is one that will allow a sufficiently fast heating time with a minimum of arcing in the electrode assembly. Also, with too high a frequency, it should be noted that it is possible to heat adhesive 22 so fast that the chemical reaction therein cannot keep pace with the temperature rise.

The present disclosure also provides an inventive method of bonding a material assembly 10 using the above described inventive system 100. The method includes providing the material assembly 10 for bonding, which according to embodiments includes assembling a plurality of layers of material to form the material assembly 10 for bonding. According to embodiments, assembling the material assembly 10 includes layering the skin member 12, the reinforcement member 14, and applying the uncured adhesive 22 between mating surfaces of the skin member 12 and the reinforcement member 14 at the predetermined locations of the material assembly where the bonds are to be formed. The method additionally includes coupling the coupling the interchangeable nest 20 to the first electrode plate 30 of the pair of electrode plates and coupling the interchangeable electrode assembly 37 to the second electrode plate 36 of the pair of electrode plates.

The method continues with positioning the material assembly 10 on the interchangeable nest 20. According to embodiments, this includes laying the material assembly 10 on a plurality of fingers 15 which contact the outer edges of the underneath surface of the skin 12. Fingers 15 ride on rollers 17 to form a trolley which carries the uncured material assembly 10 rightwardly in FIG. 6 by way of a piston arrangement 13. The material assembly 10 is thus carried into the chamber 27 of the dielectric heater 26 to a position wherein the skin 12 is supported above nest 20.

According to embodiments, the nest 20 and electrode plate 30 are then upward driven by a hydraulic piston 32. After the material assembly 10 has been located above nest 20, hydraulic piston 32 is actuated to cause the nest to rise upwardly and lift the assembly 10 from its supporting fingers 15 thereby depositing the skin 12 in the nest 20. The piston 32 continues to carry the nest 20 upwardly to bring the plurality of concentrator members 38 of the interchangeable electrode assembly 37 into contact with the predetermined locations on the material assembly 10 where the adhesive 22 is located for bonding.

The method then continues with applying a high frequency signal to the electrodes 30, 36 from the dielectric heater 26 to bond the material assembly 10 together. As described above, according to embodiments, applying the high frequency signal includes applying a high frequency signal having a frequency of between 10 megahertz to 110 megahertz at a voltage of between 300 to 8000 volts. According to embodiments, the high frequency signal is applied for 15 to 40 seconds.

The method additionally includes circulating a cooling fluid in the plurality of cooling channels 21 defined in the body 19 of the interchangeable nest 20 to cool the material assembly 10 after bonding. According to embodiments, the method additionally includes circulating a cooling fluid in a plurality of cooling channels 70 defined in a body 72 of the interchangeable electrode assembly 37 to cool the material assembly 10 after bonding.

The present invention is particularly well suited for high volume production. By way of a nonlimiting example, after the interchangeable nest 20 has been raised into the position shown in FIG. 4, good bond strength is achieved by applying the electric field at a constant frequency and constant voltage for a period of between 15 and 40 seconds. The term "constant" as used herein refers to the fact that frequency and voltage are not purposely varied during the heating cycle to achieve a significant dual heating rate. It has unexpectedly been found that this process has a built in "fail safe" mechanism that prevents overheating which could destroy the smooth exterior surface of skin 12. By using a chemically reactive thermosetting adhesive to bond together two previously cured thermosetting FRP parts, the heat generated in the adhesive will be sufficient to bring the adhesive just past its curing temperature relatively quickly. However, once the adhesive cures, the heat generated therein tends to decrease over time even though the applied field is constant. Although this phenomena is not totally understood, it is believed that it is due to a change in dielectric properties of the adhesive between its cured and uncured states. In this specific example, the voltage source 46 is energized for a period of between 30 to 40 seconds at a frequency of 34 MHz and a voltage of approximately 4400 volts. This provides sufficient time to ensure uniform curing of the adhesive while at the same time is quick enough to provide manufacturing economy, particularly given the presence of cooling channels 21, 70 within the nest 20 and the electrode assembly 37, respectively, which according to embodiments are activated for 20 to 45 seconds. Then, piston 32 is lowered and the bonded assembly is removed from the heater 26. According to embodiments, the overall cycle time from when the unbonded material assembly 10 is placed within the heater 26 to when the bonded material assembly 10 is removed from the heater 26 is between 30 and 90 seconds, preferably 60 seconds.

The above technique is believed to be considerably more advantageous over other methods for bonding reinforcement members to thermosetting SMC skins. Conventional radiant heating methods are generally too slow and result in non-uniform bonds and/or excessive heat generated by the adhesive which can burn and show through the exterior skin. Induction heating generally requires the use of metallic particles in the adhesive or areas to be heated. This is not a practical approach for exterior automotive body panel assemblies. The apparatus of the preferred embodiment is also designed to overcome problems which have been found to be present when attempting to use dielectric heating for bonding relatively large parts. It has been discovered that if a single elongated electrode is used to bond parts exceeding about 47 inches at 34 MHz, uneven heating can unexpectedly occur. Although the reason for this phenomena is not completely understood, it is believed that the uneven heating is caused because various areas of the elongated electrode will have certain peaks of energy radiating therefrom which may be due to the fact that the electrode length approaches $\frac{1}{15}$ of a wavelength of the alternating voltage source 46 (thereby producing heat variations of greater than or equal to 10%). Thus, various voltage rises are created along the length of the two opposing electrodes and can result in uneven heating of the parts. The preferred embodiment of this invention is believed to solve many of these problems and provide the manufacturer with the needed flexibility to fine tune the apparatus to the particular parts being bonded. Still other advantages of the present invention will be apparent to those skilled in the art upon a study of the drawings, specification and claims herein presented.

EXAMPLES

The above-disclosed invention is used to test different adhesives. A 15 kW side loading shuttle RF press is utilized operating at 27.12 MHz (Max 3.5 Amps). The upper electrode plate 36 is 20 inches by 36 inches and has a concentrator plate 38 installed thereon. The system utilized is fitted with Allen-Bradley controls with built-in arch protection faults. The equipment is controlled to a target plate current with programmable pre-heating, step heating, and cooling times. The results of the heating feasibility tests using four different types of adhesive are shown in Table 1 below. The adhesives are supplied by various commercial suppliers. The adhesives tested include 1C-Polyurethane (resin/supplier A), 2C-Polyurethane (resin/supplier B) and 2C-Epoxies (resin/supplier C and resin/supplier D). The test specimens utilized are 100 mm×100 mm×6.5 mm Compressed Honeycomb cutouts. The bondline dimensions are 100 mm×100 mm×1 mm Thick.

TABLE 1 heating feasibility tests using four different types of adhesive.

| Adhesive Sample | Plate Current (Amps) | Heating Time (seconds) | Internal Temperature (° C.) | Cycle |
|---|---|---|---|---|
| PG-8500 #1 | 1.4 | 20 | 78 | 1st |
| PG-8500 #1 | 1.4 | 20 | 128 | 2nd |
| Lord 380 #1 | 1.4 | 20 | 110 | 1st |
| Lord 380 #2 | 1.4 | 30 | 135 | 1st |
| Araldite 2014 #1 | 1.4 | 20 | 100 | 1st |
| Araldite 2014 #1 | 1.4 | 20 | 138 | 2nd |
| Araldite 2014 #2 | 1.4 | 30 | 135* | 1st |
| Teroson 1511 #1 | 1.4 | 20 | Arc* | 1st |
| Teroson 1511 #2 | 0.8 | 8 | 37 | 1st |
| Teroson 1511 #2 | 0.8 | 10 | 57 | 2nd |
| Teroson 1511 #2 | 1.0 | 10 | 83 | 3rd |
| Teroson 1511 #2 | 1.2 | 10 | 74 | 4th |
| Teroson 1511 #3 | 1.0 | 15 | Arc* | 1st |

Notably, the Teroson 1511 1C-PU adhesive had multiple arcing events and the Araldite 2014 2C-Epoxy adhesive had an extreme foaming event.

Although one detailed embodiment of the method and apparatus of this invention has been illustrated in the accompanying drawings and described in the foregoing detailed description, it will be understood that the invention is not limited to the particular embodiments described herein but is capable of numerous rearrangements, modifications and substitutions without departing from the scope of the invention. For example, the method and apparatus may be successively utilized to produce assemblies comprising three or more members, such as an automotive door manufactured of a first, outer fiber reinforced plastic member, a middle metal member, and a second, inner fiber reinforced plastic member. Other changes will suggest themselves to those skilled in the art. The following claims are intended to encompass all such modifications.

The invention claimed is:

1. A system for dielectric bonding, the system comprising:
   a dielectric heater having a pair of opposing electrode plates;
   a nest removably coupled to a first electrode plate of the pair of electrode plates, the nest being configured to support a material assembly, the nest having a plurality of first cooling channels defined in a body thereof, the first cooling channels configured to circulate a first cooling fluid therein to cool the material assembly;
   an interchangeable electrode assembly removably coupled to a second electrode plate of the pair of electrode plates, the electrode assembly having a plurality of concentrator members, each of the concentrator members having a second cooling channel defined in a body thereof to circulate a second cooling fluid therein to cool the material assembly after bonding, the plurality of concentrator members configured to concentrate energy from a voltage source in predetermined locations on the material assembly.

2. The system of claim 1 wherein the pair of opposing electrode plates are configured to be movable toward and away from one another.

3. The system of claim 1 wherein the first electrode plate of the pair of electrode plates is electrically grounded.

4. The system of claim 1 wherein the nest is formed of a material that exhibits low dielectric loss characteristics.

5. The system of claim 1 wherein the nest is formed of aluminum or brass.

6. The system of claim 1 wherein the nest has a contoured surface that is configured to correspond to a contour of a surface of the material assembly.

7. The system of claim 1 further comprising another interchangeable nest with a different contoured surface that corresponds to a different material assembly relative to the nest.

8. The system of claim 1 wherein the plurality of concentrator members are projections that extend away from the interchangeable electrode assembly toward the nest.

9. The system of claim 1 wherein the concentrator members are positioned to correspond with locations on the material assembly that are to be bonded together.

10. The system of claim 1 further comprising a plurality of interchangeable electrode assemblies each having a different configuration of concentrator members that correspond to a different material assembly.

11. A method of bonding a material assembly using the system of claim 1, the method comprising:
    providing the material assembly for bonding;
    coupling the nest to the first electrode plate of the pair of electrode plates;
    coupling the electrode assembly to the second electrode plate of the pair of electrode plates;
    positioning the material assembly on the nest;
    bringing the plurality of concentrator members of the electrode assembly into contact with predetermined locations on the material assembly;
    applying a high frequency signal to the electrode assembly from the dielectric heater to bond the material assembly together, and
    circulating the first cooling fluid in the plurality of the first cooling channels defined in the body of the nest to cool the material assembly after bonding.and
    circulating the second cooling fluid in the second cooling channels of each of the plurality of concentrator members after bodning.

12. The method of claim 11 further comprising assembling a plurality of layers of material to form the material assembly for bonding.

13. The method of claim 11 wherein the material assembly for bonding includes a skin member, a reinforcement member, and an uncured adhesive between mating surfaces of the skin member and the reinforcement member positioned at the predetermined locations of the material assembly.

14. The method of claim 13 wherein the uncured adhesive foams and expands when the high frequency signal is applied to the material assembly.

15. The method of claim 11 wherein the material assembly for bonding has a high aspect ratio.

16. The method of claim 11 wherein applying the high frequency signal includes applying a high frequency signal having a frequency of between 10 megahertz to 110 megahertz at a voltage of between 300 to 8000 volts.

17. The method of claim 11 wherein the high frequency signal is applied for 15 to 40 seconds.

18. The method of claim 11 further comprising removing the nest and inserting another interchangeable nest with a different contoured surface that corresponds to a different material assembly relative to the nest, and coupling the other interchangeable nest to the first electrode plate of the pair of electrode plates prior to positioning the material assembly on the other interchangeable nest.

* * * * *